UNITED STATES PATENT OFFICE.

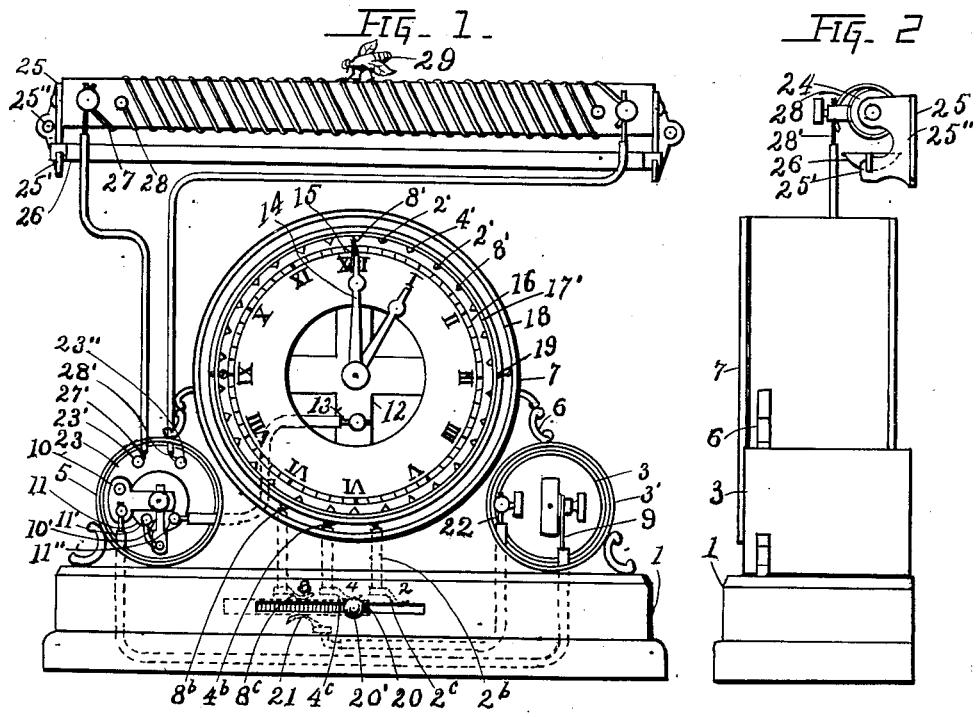

JACOB JONES, OF ST. JOSEPH, MISSOURI, ASSIGNOR TO ELECTRIC PEST EXTERMINATOR CO., OF ST. JOSEPH, MISSOURI, A PRIVATE COPARTNERSHIP FIRM.

TIME-CONTROLLER FOR ELECTRIC CURRENTS.

1,174,504.  Specification of Letters Patent.  Patented Mar. 7, 1916.

Application filed November 18, 1913. Serial No. 801,709.

*To all whom it may concern:*

Be it known that I, JACOB JONES, a citizen of the United States, residing at St. Joseph, in the county of Buchanan and State of Missouri, have invented certain new and useful Improvements in Time-Controllers for Electric Currents, of which the following is a specification, reference being had therein to the accompanying drawing.

My invention relates to improvements in time controllers for electric currents, the objects of which are, to provide a mechanism of this class, by the use of which, electric devices, connected therewith, shall be intermittently energized at the ends of periods of time, of predetermined duration, for economizing in the use of electric energy.

Further objects are to so construct said controller that the same shall be particularly adapted to the controlling of electric currents used in energizing electric exterminators, for killing pests.

Still further objects are to provide a complete time controlled electric unit which shall be durable, compact, and neat in appearance.

I attain these objects by the mechanism illustrated in the accompanying drawing, in which:—

Figure 1 is a front view of the controller and of an electrocuting device, connected therewith. Fig. 2 is a side view of parts seen in Fig. 1, looking toward the left. Fig. 3 is an enlarged perspective view, in detail, of a portion of the fixed electrodes.

Referring to Fig. 1, on the base 1, are mounted the battery case 3, induction coil case 5, and front 6. In the upper surface of said front rests the front end portion of clock case 7, which is secured on base 1 in any suitable substantial manner, not shown. In case 3 is placed the cell of dry battery 3', provided with primary electric conductor 9, which connects said battery with electric circuit interrupter 10, mounted over the front end of primary coil 11. One of the terminals 11' of said primary coil, is connected with interrupter vibrator 10', while the other terminal 11'', of said coil, is connected with metal clock frame 12, by primary conductor 13. Metal minute hand 14 is electrically connected with said clock frame, through the well known metal parts of the clock, not shown. Movable electrode 15 is secured on and carried by the free end of said minute hand, for contacting the fixed electrodes 8', 2', 4', 2', 8', and so on, in the order named. Said fixed electrodes are arranged in the same consecutive order, around the entire outer edge of clock dial 16.

Referring to Fig. 3, fixed electrodes 8' are formed on the inner edge of electrode ring $8^a$, at such distances from each other, as adapts them to be contacted by electrode 15, at intervals of eight minutes of time, while fixed electrodes 4' are formed in the same manner, on electrode ring $4^a$, and are so placed that they bisect the spaces between electrodes 8'. Fixed electrodes 2' are similarly formed on electrode ring $2^a$, but are of such frequency, that they bisect the spaces between electrodes 8' and 4'. Said electrode rings have insulation 17 between them, and have their outer edges and surfaces covered by insulation 17'. The thus built-up groups of electrode rings are secured together by the sheet metal binder 18, crimped thereon, and are secured on clock dial 16, (see Fig. 1), by screws 19, formed of nonconducting substance such as hard rubber, fiber or the like. Said fixed electrode rings are respectively connected with the elastic controller electrodes $8^c$, $4^c$, and $2^c$, by conductors $8^b$, $4^b$ and $2^b$. The metal controller bar 20, provided with thumb knob 20', is slidably mounted in base 1, and is adapted to be slid out of and into contact with said elastic electrodes. Said bar is normally in contact with elastic electrode 21, connected by conductor 22 with battery 3'. Around the primary coil 11, is wound the secondary coil 23, provided with terminals 23' and 23''. Said primary coil 11, its interruptor 10, and the secondary coil 23, form a step-up transformer, for the current of electricity, generated by battery 3', and since said parts may be of any well known form, the same are only partially shown and described.

Where brevity is hereinafter required, said parts collectively, will be termed a transformer.

In the exterminator, seen in Fig. 1, roller 24 is either formed of or covered with any good insulating material. Said roller is rigidly mounted on brackets 25, secured at 25'' on any desired fixed object, not shown.

Said brackets have hooks 25' formed on their lower ends, in which the ends of catch-trough 26 are detachably held. The high potential naked electrocuting wires 27 and 28, are tightly wound on roller 24, in alternated spirals. The left end of wire 27 is connected with secondary terminal 23', by conductor 27', while the right end of wire 28 is connected with secondary terminal 23" by wire 28'. Said wires are properly spaced to be trod upon, at the same time, by the feet of a fly 29, standing thereon.

In installation and operation, the operator of the exterminator, places the described parts in the positions shown and described, then by thumb knob 20', he slides bar 20 until said knob is even with point 8, with said bar in contact with electrodes 8ᶜ and 21, for energizing the electrocuting wires 27 and 28, intermittently at the end of each period of eight minutes of time; but should he desire a two minute period of time, he slides said button even with point 2. Should said operator desire that said period of time shall be four minutes, he slides said thumb button even with point 4 as shown in Fig. 1. Said operator then winds and starts the described clock in the usual manner, by parts neither shown nor described.

When minute hand 14 carries movable electrode 15 into contact with fixed electrode 8', (as shown,) the primary circuit from battery 3' is closed through the following conductors. From said battery through conductor 9, interrupter 10, interrupter vibrator 10', primary terminal 11', primary coil 11, primary terminal 11'', conductor 13, clock frame 12, minute hand 14, movable electrode 15, fixed electrode 8', ring 8ᵃ, (see Fig. 3,) conductor 8ᵇ, elastic electrode 8ᶜ, controller bar 20, elastic electrode 21, and thence through conductor 22, back to battery 3'. The thus closed primary circuit conducts the primary electric current from said battery through said primary coil, until electrode 15 is carried by minute hand 14, from contact with electrode 8', which opens said circuit until the same is again closed, as hereinafter described. While said primary coil is thus energized, the same induces a high potential secondary electric current of electricity, through the described secondary electric circuit: Secondary coil 23, secondary terminal 23', conductor 27', electrocuting wire 27, fly 29, wire 28, conductor 28', and thence through secondary terminal 23'', back to secondary coil 23.

It will be understood that battery 3' generates a current of such potential energy, as delivers a secondary current of such energy, that fly 29 is electrocuted thereby. When said electric impulse has ceased, said fly gravitates into catch-trough 26. When desired, said operator lifts said trough from hooks 25', and empties the same of the thus electrocuted flies, and returns said trough to the position shown.

While controller bar 20 is in the position described and shown, it will be seen that elastic electrode 2ᶜ, is not in contact therewith, and therefor understood, that fixed electrode 2' is dead, and that movable electrode 15 is carried into and from contact therewith, without closing the previously described electric circuit or causing any electric impulse, in any of the described parts.

When electrode 15 is carried into contact with fixed electrode 4', the previously described primary circuit is again closed, but the same is done through said fixed electrode and its described connections with elastic electrode 4ᶜ. Since said fixed electrodes have two minute spaces between them, it is evident that when knob 20' is slid even with point 2, bar 20 is in contact with all three of the elastic electrodes and thereby electrifies all of the fixed electrodes around dial 16. While such is done, movable electrode 15 closes the previously described primary circuit at each and every contact with said fixed electrodes, at the end of each two minutes of time.

When there is no fly 29 on wires 27 and 28, the described secondary circuit is thereby left open, and counter electromotive force thereby caused to be generated in primary coil 11, retards the action of battery 3', thereby economizing in the use of its electric energy.

When bar 20 is slid toward the left, to the limit of its movement, the same is removed from contact with all of the previously described controller electrodes, and the electric devices of the controller, stand idle.

Having fully described my invention, what I claim as new, and desire to secure by Letters Patent is:—

1. The combination in a controller of the class described, of electric conductors for forming a closable circuit; a plurality of separately insulated electrode rings bound together in superimposed position; a plurality of electrodes formed on the inner edges of said rings at predetermined distances from each other; a circuit closer revolved in the space surrounded by said rings for contacting said electrodes in consecutive order and thereby momentarily closing said circuit; and a ring selector whereby said rings are additionally connected one ring at a time in multiple in said circuit.

2. In a controller of the class described, the combination with a clock having a dial and a case therefor and a base for said case; of a plurality of separately insulated electrode rings bound together in superimposed position and secured on the outer edge portion of said dial; a plurality of evenly spaced electrodes formed on the inner edges of said rings said electrodes being so spaced on the second one of said rings that they bisect the spaces between the electrodes of the first ring, while the electrodes on the third ring bisect all of said bisected spaces; electric conductors adapted to form a closable electric circuit through said rings and through other electrically operated devices; a minute hand for said clock; a circuit closer carried on the free end of said minute hand for momentarily contacting said electrodes in consecutive order; and a ring selector in said clock case base whereby said rings are additionally connected one ring at a time in multiple in said circuit for adjusting the frequency of the closing of said circuit.

In testimony whereof I affix my signature in the presence of two witnesses.

JACOB JONES.

Witnesses:
 EDNA MOORE,
 MATTHEW B. WINTON,